United States Patent [19]

Sprague

[11] 4,239,249

[45] Dec. 16, 1980

[54] PROJECTILE PALLET TRUCK

[75] Inventor: John M. Sprague, Mt. Carroll, Ill.

[73] Assignee: United States of America, Washington, D.C.

[21] Appl. No.: 33,936

[22] Filed: Apr. 27, 1979

[51] Int. Cl.³ .................................................. B62B 1/08
[52] U.S. Cl. ................................ 280/47.2; 280/47.27; 414/444
[58] Field of Search ................ 280/47.2, 47.24, 47.17, 280/47.26; 414/444

[56] References Cited

U.S. PATENT DOCUMENTS

| 1,012,139 | 12/1911 | King | 280/47.2 X |
|---|---|---|---|
| 1,542,327 | 6/1925 | Slingsby | 280/47.2 X |
| 2,243,915 | 6/1941 | Mueller | 280/47.2 X |
| 2,277,302 | 3/1942 | Chenette | 280/47.2 X |
| 2,818,988 | 1/1958 | Dunkin | 280/47.2 X |
| 3,107,446 | 10/1963 | Messinger | 280/47.24 X |
| 3,157,411 | 11/1964 | Rhodes | 414/444 X |

*Primary Examiner*—David M. Mitchell
*Assistant Examiner*—Michael Mar
*Attorney, Agent, or Firm*—Nathan Edelberg; Robert P. Gibson; Robert O. Richardson

[57] ABSTRACT

A projectile pallet hand truck is provided for one man mechanical operation in moving heavy loads. Curved rocker arms on wheels facilitate pallet positioning, and an extensible lever is used in transferring the load center of gravity over tricycle wheels for movement. Extra handles are provided for easier operator movement when the truck is in loaded position.

6 Claims, 7 Drawing Figures

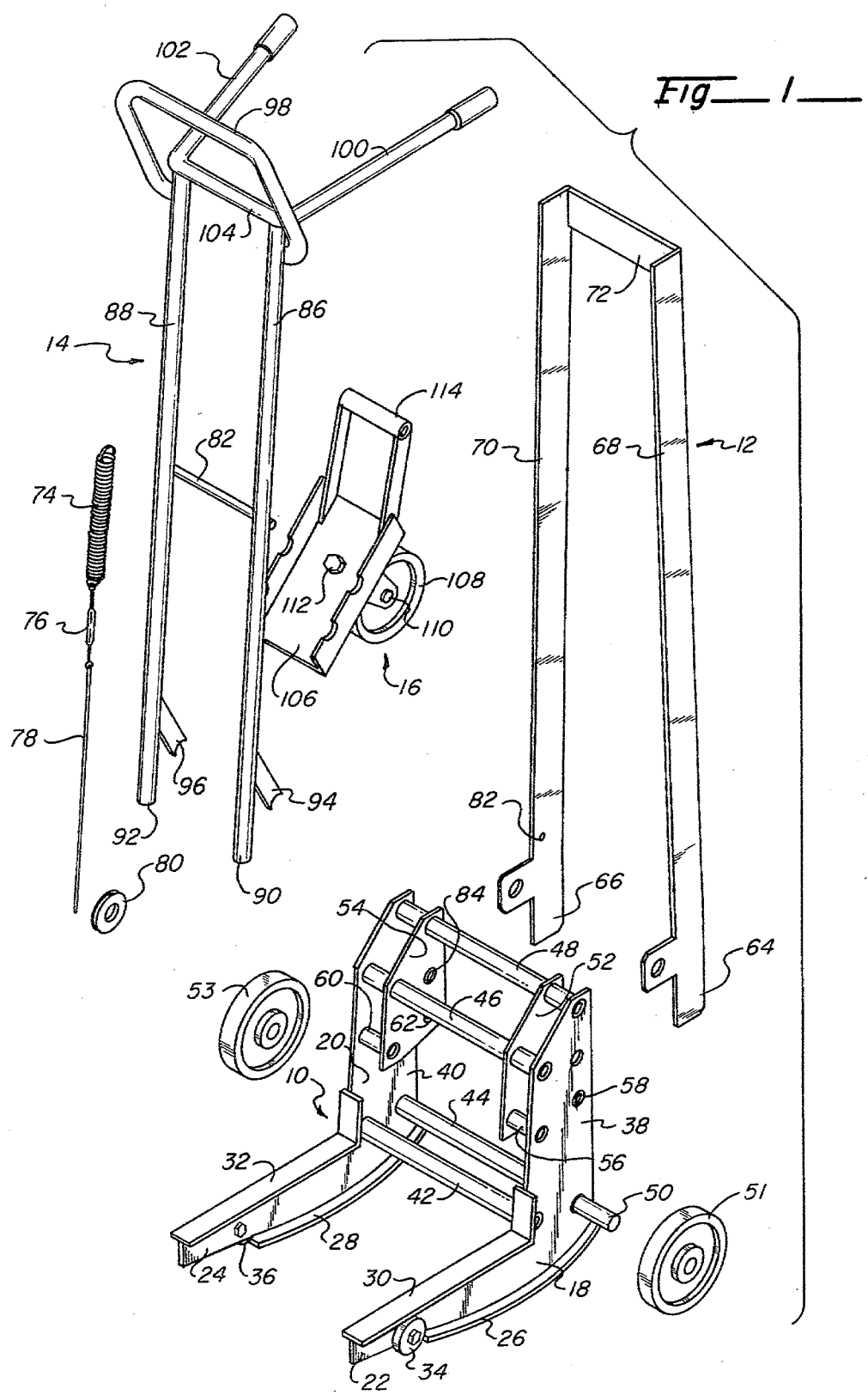

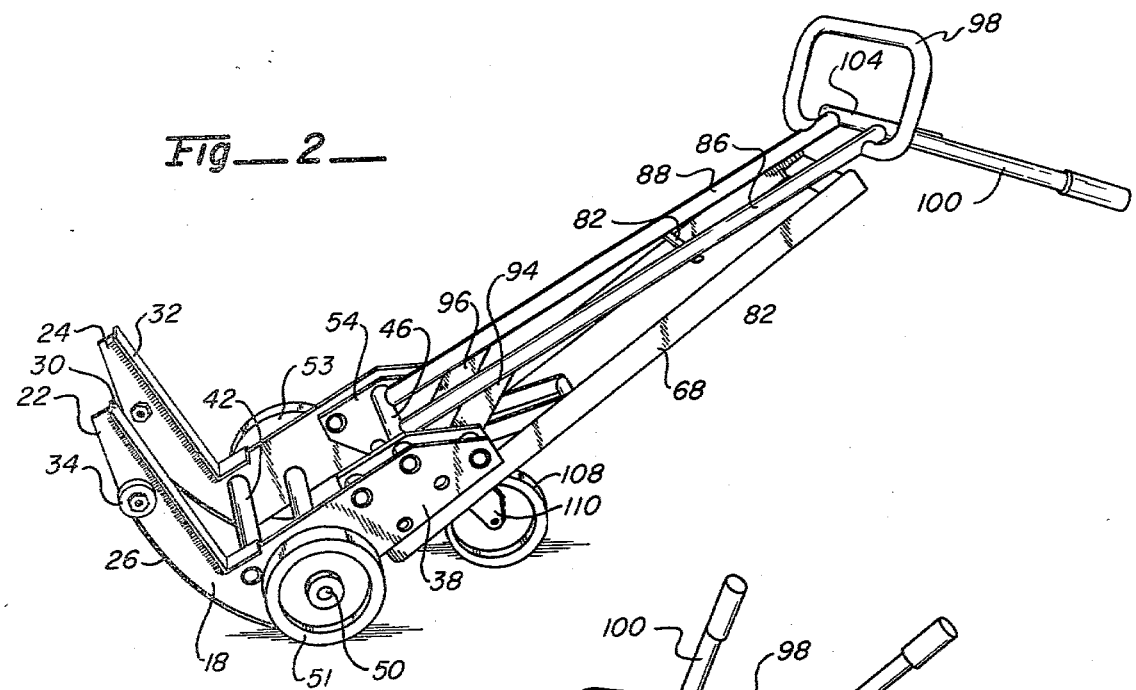
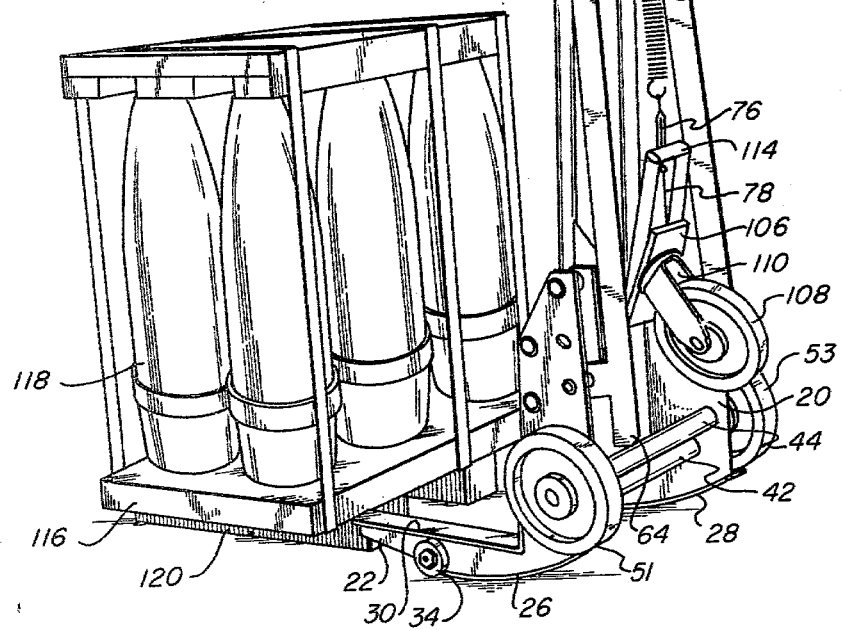

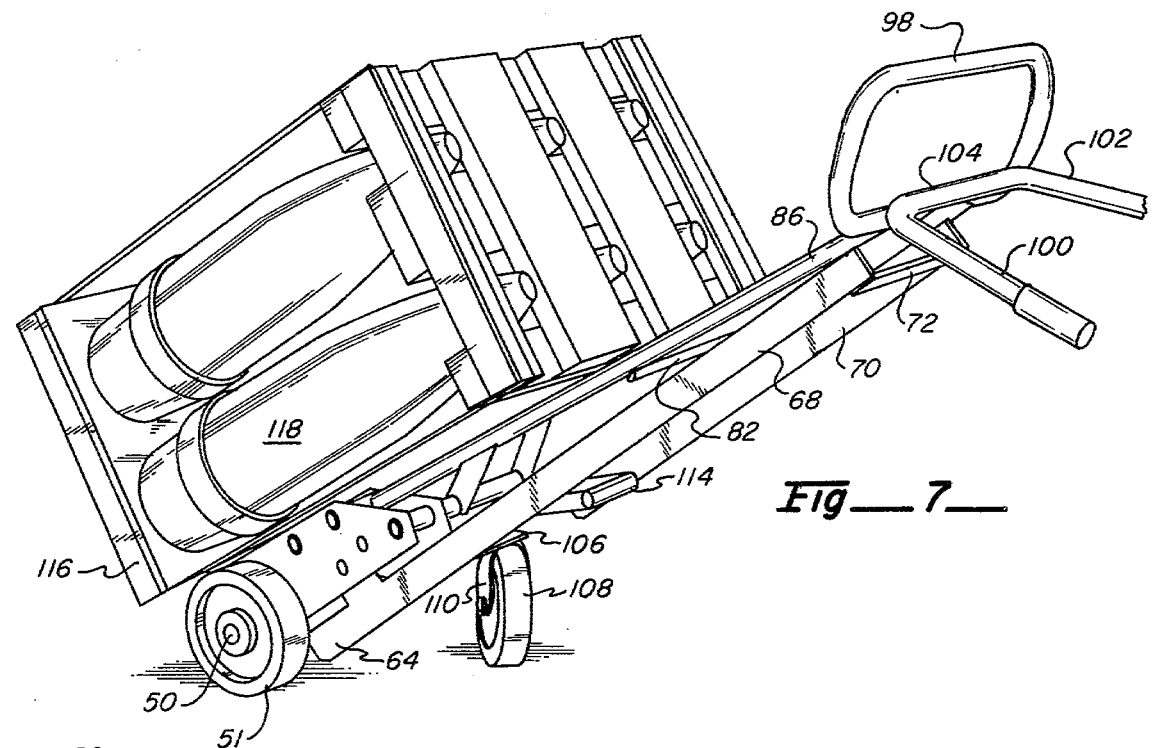
Fig__7__
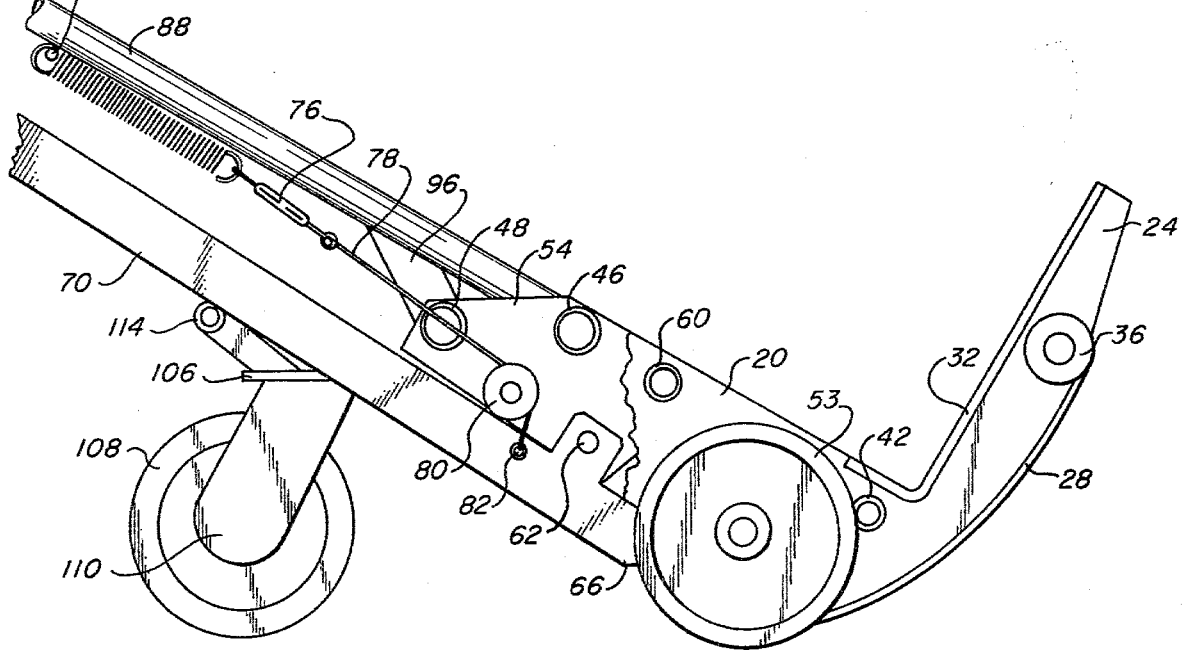
Fig__3__

PROJECTILE PALLET TRUCK

GOVERNMENT RIGHTS

The invention described herein may be manufactured and/or used by or for the Government for governmental purposes without the payment of any royalty thereon.

BACKGROUND OF THE INVENTION

Artillery projectiles typically are packed on wooden pallets in two rows of three, or six to a pallet. The weight of a loaded pallet ranges from 800 to 1,270 lbs. per pallet depending on the size of the projectiles. Currently a need exists for a manual means of moving the ammunition pallets from storage magazines into the firing battery or onto front line vehicles which take the projectiles to the weapon which will fire them. This movement or projectile pallets is usually required to remote storage sites which do not have access to mechanical forklifts. Also, a backup system for moving, storing and/or loading projectiles may be required in the event of a break down of mechanical equipment.

Commercially available hand trucks, typically used for transporting heavy loads, do not meet the specific requirements for moving the ammunition pallets. This is mainly because of the extreme weight of the loaded pallets (1,270 lbs. for 8" projectiles). Since one man would have a great deal of difficulty handling a load of this magnitude, commercial hand trucks simply are not designed to carry such loads. Additionally, the ammunition pallets have a low center of gravity. This makes them more difficult to move, with a hand truck, than a load of equal weight with the center of gravity situated higher on the load. It is well known that when using conventional hand trucks, the loaded truck must be pivoted rearward until the center of gravity of the load is behind the axle of the truck. This allows the truck to carry most of the weight of the load and positions the truck so that it can be easily maneuvered. However, when the center of gravity is very low, the hand truck must be pivoted much further rearwardly before the weight transfers behind the truck axle. This forces the operator to bend forward into an unnatural position, making it much more difficult to move the heavily loaded truck.

SUMMARY OF THE PRESENT INVENTION

The present invention relates to a projectile pallet hand truck designed specifically for transporting projectile pallets and other heavy loads. It is obvious that a hand truck designed to carry loads approaching 1,300 lbs. must be rugged in construction. Understandably, the weight of the unloaded hand truck is then significant. For this reason, a hand truck in accordance with the present invention is provided with two small wheels near the tip of each lifting fork. These wheels serve to carry the weight of the truck when being positioned under or removed from beneath a pallet.

The truck is also provided with a tilt assist lever, rocker shaped forks, and a third wheel or castor. The third wheel supports the truck when loaded, eliminating the need to balance the unusually heavy loads. This wheel is swivel mounted to facilitate steering of the loaded truck.

The tilt assist lever allows one man to easily load the projectile pallets onto the truck. The tilt assist lever comprises a pivotally mounted lever which is normally held in a retracted position by means of a helical spring. When loading, the truck is first positioned under the pallet. The assist lever is then manually lowered against the tension of the return spring. By placing a foot on the assist lever the operator is able to utilize his full body weight to initiate the transfer of the pallet from the floor to the truck. The rocker shaped forks provide for a smooth transfer of weight to the wheels of the truck. Only a slight application of downward force on the truck handles is required to complete the weight transfer to the wheels. The tilt assist lever is automatically returned to the retracted position by the helical spring when the operator's foot is removed.

Due to the extreme angle of the truck when in the carrying position, the handles are too low to comfortably move the loaded truck. For this reason an additional loop handle is provided which is situated at a convenient height for the operator when the truck is loaded and tipped onto the wheels.

Since the center of gravity of the load is just behind the truck axle, it is easy to return the pallet to the floor by lifting upwardly on the handles of the truck.

BRIEF DESCRIPTION OF DRAWINGS

FIG. 1 is an exploded view in perspective of the pallet truck;

FIG. 2 is a perspective view of the unloaded truck;

FIG. 3 is a partially cutaway side elevational view of the truck showing the tilt assist lever retractor spring and cable.

FIG. 4 is a perspective view of the truck being positioned under an ammunition pallet;

FIG. 7 is a perspective view of the loaded cart showing the tilt assist lever retracted.

DETAILED DESCRIPTION OF ILLUSTRATIVE EMBODIMENTS

Figure 6:
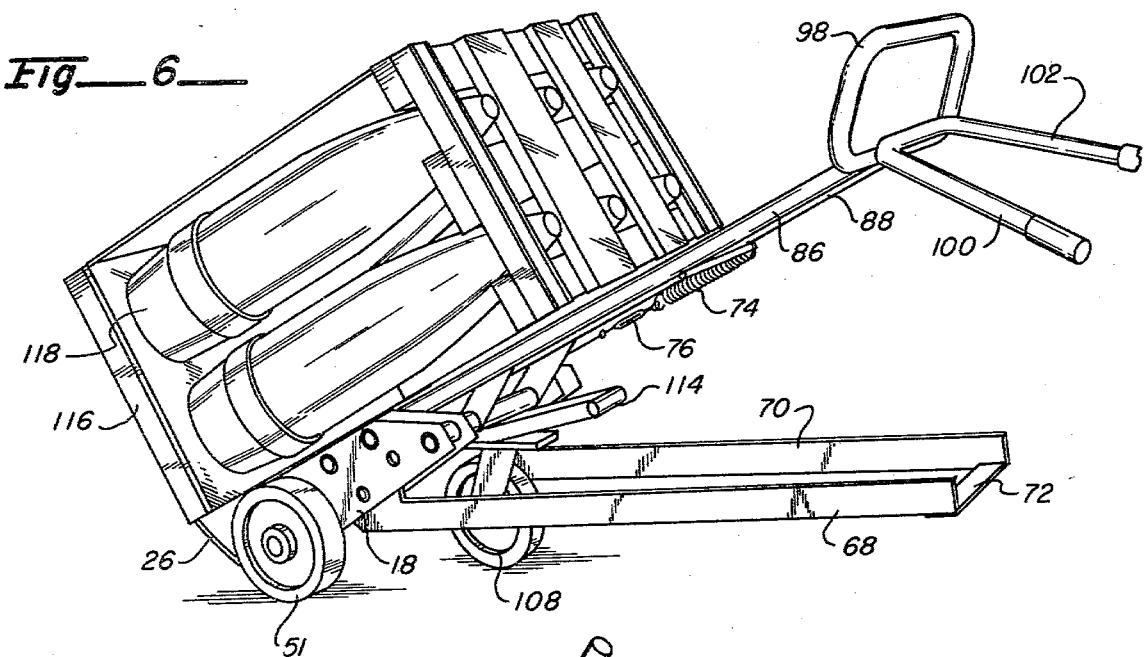
FIG. 6 is a perspective view similar to FIG. 5 showing the truck tilted onto the third wheel.

Reference is now made to FIG. 1 which shows in exploded form a base frame 10, tilt assist lever 12, handle section 14, and third wheel mount 16 comprising the projectile pallet hand truck of this invention.

The base frame 10 includes a pair of L-shaped plates 18, 20, the lower legs of which form the lift forks 22, 24 of the truck. These forks are curved along their bottom surfaces to permit a tilting or rocking motion. Flat strips 26, 28 on the bottom edges, and strips 30, 32 on the top edges give the forks an I-beam appearance for strength and also wider bearing surfaces. At about the mid-point of the forks 22, 24 are mounted a pair of fork wheels 34, 36 used to facilitate movement of the truck forks under a loaded pallet.

The upper legs 38, 40 of plates 18, 20 are connected and maintained in spaced relation by connectors 42, 44, 46 and 48. Connector 44 is tubular and serves as a bearing through which an axle 50 extends for the mounting of wheels 51, 53. Connectors 46 and 48 have reinforcement plates 52, 54 thereover which are spaced inwardly from legs 38, 40 respectively. Spacers 56, 58 are positioned between leg 38 and plate 52, and spacers 60, 62 are also positioned between leg 40 and plate 54.

Spacers 58 and 62 also serve as pivotal attachments for the tilt assist lever 12 and spacers 56 and 60 serve as stops against which the short arms 64, 66 of lever 12 abut when the lever is used in tilting the base frame 10 rearwardly and downwardly to its support position. Lever 12 also has long arms 68, 70 which are on the order of ten times the length of the short ones 64, 66 to give the lever a mechanical advantage of approximately 10 to 1. Crosspiece 72 between arms 68, 70 serves as a step upon which an operator can stand to impart a force of about ten times his weight in rocking the base frame 10 rearwardly. The tilt assist lever 12 is releasably retained in a stored or non-use position adjacent the underside of the handle section 14 by means of a spring 74, turnbuckle 76 and cable 78. Cable 78 passes over a roller guide 80 and is connected to the lever 16 at aperture 82 which is above its fulcrum. The spring 74 is fastened to crossbar 82 on handle section 14 and roller guide 80 is rotatably mounted on reinforcement plate 54 at aperture 84.

The handle section 14 includes a pair of arms 86, 88 having lower ends 90, 92 adapted to be fastened to connector 46, such as by welding. Gussets 94, 96 interconnect arms 86, 88 with connector 48 and serve to brace and rigidly connect the handle section to the base frame. Crossbar 82 extends between arms 86, 88 for greater rigidity. At the top of arms 86, 88 is a dual handle arrangement, one of which is useful when the truck is in upright or loading position and the other of which is useful when the truck has been tilted to its support or moveable position. This dual handle arrangement includes a loop handle 98 that extends upwardly and forwardly when handle arms 86, 88 are substantially upright, as shown. The other handle is a pair of handlebars 100, 102 that extend upwardly, outwardly and rearwardly when the handle arms 86, 88 are substantially upright, as shown. Preferably the handlebars are connected with another crossbar 104 extending between arms 86, 88 for strength and rigidity. The handlebars 100, 102 are useful for the operator to bear down upon in assisting in the rearward tilting action after the tilt assist lever has touched the floor. The operator may stand between the handlebars and bear his weight on them through his arms. As will be seen in subsequent views, when the truck has been tilted to its support position, these handlebars 100, 102 are inconveniently too close to the floor but the loop handle 98 is then in a convenient position for operator use in moving the truck about.

The third wheel mount 16 provides for a third wheel support, with wheels 51, 53, when the truck is tilted backward to its support position. This mount includes a support plate 106 adapted to be welded to connectors 46, 48. A wheel 108 is rotatably mounted on bracket 110 which, in turn, has a swivel connection 112 with the support plate 106. This support plate also has a handle 114 which is useful in removing the lift forks 22, 24 from a loaded pallet after it has been moved.

Having described the projectile pallet hand truck with reference to the exploded view shown in FIG. 1, a better understanding may now be had with reference to the other views that show the truck assembled and in its several positions of use.

FIG. 2 shows the truck with the base frame 10, tilt lever 12, handle section 14 and third wheel mount 16 assembled and ready for operation. It has been tilted rearwardly and is resting on the three wheels 51, 53 and 108. The tilt lever 12 is in non-use and is stored under the handle section 14. This is the support or moving position of the truck. It may be noted that the forks 22, 24 are raised and that the loop handle 98 is in convenient position for operator use in moving the truck about.

FIG. 3 is a partial cutaway side elevational view of the truck, showing how the tilt assist lever 12 is releasably retained in stored position. As shown, cable 78 is fastened to lever long arm 70 at aperture 82 and extends over roller guide 80 on reinforcement plate 54. Spring 74 is fastened to crossbar 82 and connects to the cable by turnbuckle 76 which is adjusted to maintain the lever in stored position under the handle section 14.

In FIG. 4 the truck is shown in upright or loading position for loading a pallet 116 loaded with projectiles 118. The pallet 116 is raised, resting on legs 120, to provide space for insertion of the truck forks under the pallet. The fork wheels 34, 36 roll on the floor under the pallet as the operator moves the handlebars 100, 102 forwardly.

Figure 5:
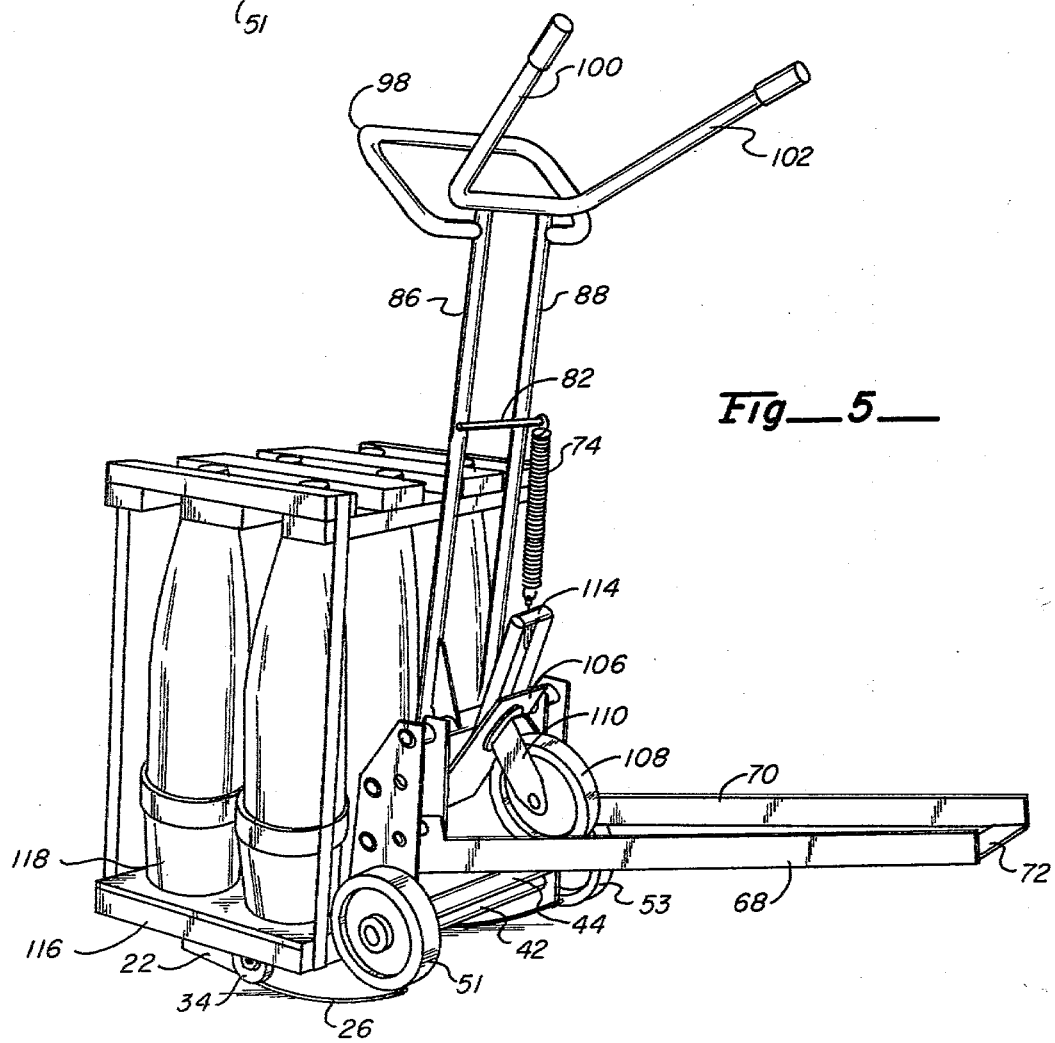
FIG. 5 is a perspective view of the truck fully positioned under a loaded pallet with the tilt assist lever extended.

FIGS. 5 and 6 show the truck in intermediate positions between the upright or loading position shown in FIG. 4 and the support or moving position shown in FIG. 7. As shown in FIG. 5 the tilt lever has been extended for use by the operator and the truck is supported on its forks 22, 24. Fork wheels 34, 36 and base frame wheels 51, 53 are raised off the floor surface.

FIG. 6 shows the truck further tilted rearwardly to its support position which resulted from the operator standing on crosspiece 72 and pulling down on handlebars 100, 102. The truck and load rests entirely on the three wheels 51, 53 and 108. In this view, the lever 12 had already touched the ground and is partially returned to its stored position.

FIG. 7 shows the truck in its support or moveable position, with the load positioned over the three wheels and the tilt lever returned to stored position. The loop handle 98 is conveniently located for operator use in moving the truck about.

In unloading, the procedure is reversed. By lifting the handlebars 100, 102, the load rotates forwardly to the position shown in FIG. 5, and then to the position shown in FIG. 4. The truck forks 22, 24 are withdrawn by the operator pulling up and back on handle 114 to free the truck from its load.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. A projectile pallet hand truck comprising:
   a base frame including a pair of spaced L-shaped plates having lower legs forming truck forks, said forks having curved bottom surfaces, said forks having fork wheels thereon, said plates having upper legs with a pair of support wheels thereon, said plates having a pluralty of connecting members therebetween to maintain said plates in spaced relationship,
   said plates having a first pair of said connecting members near the lower ends of said upper legs, one of said first pair being tubular to receive an axle, an axle extending therethrough, said support wheels being attached to said axle,
   a third support wheel affixed to a second pair of said connecting members,
   said frame having an upright position wherein said fork wheels engage a floor surface and said support wheels are above said floor surface, said frame also having a support position whereby said support wheels engage said floor surface and said fork wheels are above said floor surface, and means connected to said base frame for rocking said frame on said fork curved bottom surfaces between said positions, said means including a handle section, said handle section having arms extending upwardly from one of said second pair of connecting members on said base frame, said arms and said forks supporting a load thereon when said frame is in said support position, said base frame being raised above said floor surface and supported by said support wheels when in said support position.

2. A projectile pallet hand truck as set forth in claim 1 wherein said handle section has a pair of handle bars extending upwardly, rearwardly and outwardly from said arms to facilitate movement of said truck when said frame is in said upright position.

3. A projectile pallet hand truck as set forth in claim 2 wherein said handle section has a loop handle extending upwardly and forwardly from said handle section when said frame is in said upright position to facilitate movement of said truck when said frame is in said support position.

4. A projectile pallet hand truck as set forth in claim 1, wherein said means includes a tilt assist lever, a first and second pair of spacers on said plates, said lever being pivotally mounted on said first pair of spacers, having long arms with a step area therebetween upon which an operator may exert his weight, said lever having short arms adapted to bear against said second pair of spacers on said plates to convey a rearward tilting motion to said base frame lower legs.

5. A projectile pallet hand truck as set forth in claim 4 wherein a retaining means releasably retains said tilt assist lever in stored position adjacent said handle section.

6. A projectile pallet hand truck as set forth in claim 1 wherein said third support wheel is swivelly mounted on a support plate, said support plate being affixed to said second pair of said connecting members, and a handle on said support plate to facilitate removal of said base frame lower legs from engagement with a pallet bearing a load.

* * * * *